United States Patent [19]
Wisskirchen

[11] Patent Number: 5,728,928
[45] Date of Patent: Mar. 17, 1998

[54] CALIBRATION METHOD FOR LEVEL SENSORS WITH PRESSURE TRANSDUCER

[75] Inventor: Michael Wisskirchen, Neukirch, Germany

[73] Assignee: AWECO Kunststofftechnik Geraetebau GmbH & Co. KG, Neukirch, Germany

[21] Appl. No.: 679,400

[22] Filed: Jul. 9, 1996

[30] Foreign Application Priority Data

Jul. 15, 1995 [DE] Germany .................. 195 25 895.9

[51] Int. Cl.[6] .................................................. G01F 23/12
[52] U.S. Cl. ............................................................ 73/1.73
[58] Field of Search ............... 73/1 H, 1.73; 29/595, 29/522, 407.05

[56] References Cited

U.S. PATENT DOCUMENTS 5,079,950  1/1992  McKiernan et al. ................ 29/622

Primary Examiner—Robert Raevis
Attorney, Agent, or Firm—Spencer & Frank

[57] ABSTRACT

A method for calibrating a sensor for sensing the level of a liquid. The sensor includes: a frame; a pressure transducer disposed on the frame; an electrical switch disposed on the frame and operatively connected to the pressure transducer; a mechanical transmission operatively connecting the pressure transducer and the electrical switch to one another; and an immersion tube operatively connected to the frame and defining a closure limit location thereon, the sensor further being configured such that, when the level of the liquid rises beyond the closure limit location of the immersion tube along a longitudinal extent thereof, a volume of air is trapped in the sensor, the pressure transducer being configured for recording a pressure of the volume of air, the pressure transducer further being configured for actuating the electrical switch via the mechanical transmission when the level of the liquid rises beyond the closure limit location up to an actual switching level on the immersion tube. The method includes the step of compensating for a variation between the actual switching level on the immersion tube and a desired switching level on the immersion tube caused by random production differences of the sensor by shifting the closure limit location in a direction parallel to the longitudinal extent of the immersion tube.

8 Claims, 1 Drawing Sheet

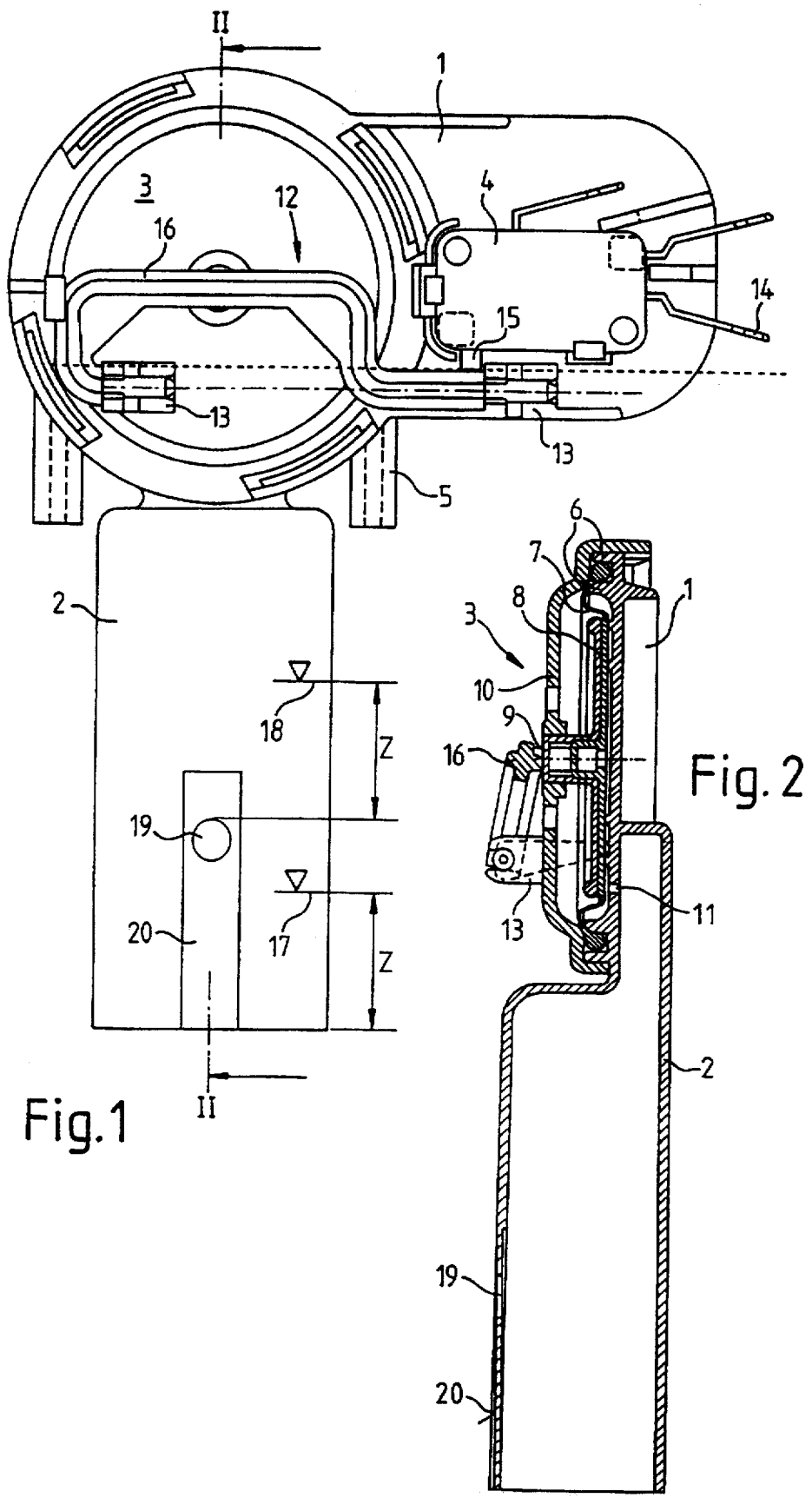

CALIBRATION METHOD FOR LEVEL SENSORS WITH PRESSURE TRANSDUCER

FIELD OF THE INVENTION

The invention relates to level sensors where a bell-like air chamber or so-called air trap is provided, and where a connected pressure transducer, particularly a pressure cell, is provided for sensing the pressure of the air chamber. A rising liquid places the air enclosed in the air trap under pressure. This pressure is used for triggering an electrical signal.

The liquid level at which the signal is triggered is called the switching level. Apart from other influences, it is determined by the height of the lower edge of the air chamber, said edge being referred to below more generally as the closure limit. The closure limit can also be the upper end of an open-edged slot in the wall of the air chamber. As long as the rising liquid has not yet reached the closure limit, there is still a connection between the air chamber and the outside air. If the liquid level exceeds the closure limit, the air volume now enclosed is compressed.

BACKGROUND OF THE INVENTION

Level pressure cells of the above type are in wide-spread use. They are employed, for example, in dishwashing machines, in order to close the water inflow valve when a specific filling level is reached and to thereby determine the filling volume. High accuracy in the millimeter range is important in this case.

The types of known level pressure cells and the components used in them differ. In general, however, it is true to say that the values of the switching level of level pressure cells produced as standard vary considerably from instrument to instrument. The differences in the switching level from instrument to instrument have various causes, the effects of which are cumulative. For example, the snap switches being used in the different instruments are actuated in response to different forces. The diaphragms employed in the pressure cells exhibit variations in terms of the distance which they cover under a specific pressure. However, if the pressure necessary for switching is greater, the water must rise correspondingly higher in order to generate this pressure in the air chamber. Further differences between instruments of a series occur as a result of the production tolerances of the transmission mechanism from the pressure cell to the switch, and influences may stem, for example, from the shape of the lever, from its mounting and from the assembly accuracy as a whole.

Although considerable differences, which may amount, for example, to 30 mm, could therefore exist in the switching level from sensor to sensor, the switching level once present in a specific sensor does not change or changes only negligibly in the course of its operating time.

Calibration (adjustment) to a specific switching level therefore has to be carried out.

It is known, in such sensors, to arrange along a mechanical transmission system, on the switch or as part of the switch, a spring, the prestress of which can be changed by means of a setscrew. A known calibration method thus involves bringing the actual switching level to a predetermined desired switching level by adjusting the set screw. However, this is very laborious and time-consuming.

SUMMARY OF THE INVENTION

The object to which the invention is based is to specify a calibration method which can be carried out in less time and which, if possible, is also suitable for automation.

In sensors of the type initially designated, this object is achieved, according to the invention, by shifting the closure limit in the direction of height in order to compensate for random production differences which cause a variation between the original actual switching level and a desired switching level. The actual switching level is thereby brought into coincidence with the desired switching level identically for all sensors.

Calibration thus takes place without any influence being exerted on the sensor mechanism proper. Neither the diaphragm of the pressure cell nor the transmission linkage or the switching force is varied. Rather only the height of the closure limit is varied. No special adjusting device on the sensor mechanism is required for this purpose, but only a variation of the immersion tube. The latter can, for example, be shortened to place the closure limit higher or an open edged slot can be made in the wall of the immersion tube and the length of the slot can be changed or, according to a preferred embodiment, a hole can be made, for example punched, in the wall of the immersion tube. Moreover, there is also the possibility of separating the immersion tube from the housing and of fastening it to the latter at an adjustable height, whilst the immersion tube could be connected to the pressure cell via a flexible hose line. It is particularly advantageous, however, to injection-mold the immersion tube from plastic together with the instrument housing as one part.

The calibration method according to the invention can be carried out with deliberate intention, that is to say, without trial and error. It is proposed to fix the sensor to be calibrated at a reproducible height and to expose it to a rising liquid, the level of which can be measured. The actual switching level, which is reached at the switching time and which is at a specific distance above the lower edge of the immersion tube, is then recorded. The new closure limit must then be placed in such a way that it is at the same distance from the desired switching level as the old closure limit is from the actual switching level.

The closure limit is preferably shifted in only one direction, namely upward. This can be effected by making a hole in the immersion tube. A precondition for this is that the actual switching level should never lie above the desired switching level.

In this procedure, it is necessary to ensure that the immersion tube has a cylindrical inner shape, that is to say a constant clear cross section, at least in its lower region in which the closure limit is moved that is, placed higher. However, even if the immersion tube is slightly conical for production reasons, this can be taken into account by computation, so that highly accurate calibration results can nevertheless be achieved.

As already mentioned, it is possible for the proposed method to be fully automated. For example, in the first method step, the sensor can be fixed by its own fastening means in a measuring vessel. In the second step, the measurement of the actual switching level and the recording of the distance from the lower edge are carried out. And in a third step, a hole can then be punched in the immersion tube.

BRIEF DESCRIPTION OF THE DRAWINGS

An exemplary embodiment of the invention is explained in more detail below by means of drawings in which, in particular:

FIG. 1. shows a side elevational view of a level sensor, and

FIG. 2. shows a cross sectional view of the level sensor of FIG. 1 along line II—II.

DETAILED DESCRIPTION OF THE INVENTION

The sensor represented comprises a plate-like housing 1, an immersion tube 2 formed onto this housing or frame, a pressure cell 3, and a microswitch 4. The sensor is provided for recording the water quantity in a dishwasher and is inserted from above the dishwasher with two tenons 5 of H-shaped cross section into a level sensor housing of the dishwashing machine and at the same time fastened by means of snap hooks (not shown), so that the immersion tube 2 projects into the water, the level of which is to be recorded.

The housing 1 has two concentric annular ribs 6, between which the bead-shaped edge of a diaphragm 7 is inserted. Attached to the diaphragm is a disk 8, the cylindrical hub 9 of which is guided axially movably in a central orifice of a cap 10. This cap 10 is slipped over the outer annular rib 6 and thus covers the diaphragm 7 and the disk 8.

The immersion tube 2 of oval cross section, which is open downward, is formed onto the housing 1. An orifice 11 in the housing wall is located in the upper region of the immersion tube 2 and within the inner annular rib 6, so that the interior of the immersion tube is connected to the cell interior between the housing wall of housing 1 and the diaphragm 7. When the rising water reaches the lower edge of the immersion tube 2, the height or longitudinal extent of which edge constitutes the closure limit in this case, the air volume in the immersion tube is enclosed. If the water rises further, this air volume is compressed, the diaphragm 7 moves to the left and the hub 9 protrudes from the cap 10.

This axial movement of the hub 9 is transmitted by a stirrup-shaped lever 12 to the microswitch 4, which is fastened to a lateral extension of the housing 1. The lever 12 has the shape of a question mark without the dot underneath, and is mounted rotatably in two bearing blocks 13 formed on the housing. The microswitch 4 includes terminal lugs designated by way of example by elements 14, and further has, on the underside thereof, a touch contact tappet 15. Cooperating with tappet 15 is a horizontal transverse arm of the lever 12, said transverse arm not being visible in FIG. 1. Consequently, when the hub 9 presses on that part 16 of the lever which is parallel to the axis of rotation of the latter, as seen in FIG. 2, said transverse arm moves upward, presses on the touch contact tappet 15 and thereby triggers a switching signal.

In the state of delivery of the sensor described thus far, the switching signal occurs when the external liquid level has reached the mark 17 on the immersion tube 2. This is the so-called actual switching level, whilst the desired switching level is designated by 18. The actual switching level 17 is at the distance Z from the lower edge of the immersion tube 2. In order to ensure that, in this sensor considered in the example, the switching signal occurs exactly at the desired switching level 18, the closure limit is shifted further upward. This is achieved by punching a hole 19 into the casing of the immersion tube 2, the hole being placed in such a way that its vertex is likewise exactly at the distance Z from the desired switching level 18. The distance Z is thus measured from the desired switching level. To make it easier to punch the hole 19, a plane rectangular surface 20 running parallel to the longitudinal axis of tube 2 is formed on the curved immersion tube casing surface 20 being slightly conical when viewed in the longitudinal direction.

If, in another sensor, the actual switching level 17 in the state of delivery is somewhat higher or lower than in the example as a consequence of production tolerances, a different distance Z is obtained and the hole 19 is correspondingly placed somewhat lower or higher than in the example.

I claim:

1. A calibration method for sensors for recording a liquid level, which sensors have a housing, an immersion tube, a pressure transducer and an electrical switch, a closed-off air volume forming in the immersion tube, from a closure limit, when the liquid rises, the pressure of said air volume being recorded by the pressure transducer which actuates the switch via mechanical transmission means, wherein a new closure limit is placed on the insertion tube above the closure limit in the direction of height as a result of a variation in the immersion tube and the original actual switching level determined by random production differences thereby being brought into coincidence with a desired switching level identical for all sensors.

2. The calibration method as claimed in claim 1, wherein the sensor is fixed at a reproducible height and is exposed to a rising fluid, wherein the actual switching level reached at the switching time is recorded and is compared with the lower edge of the immersion tube or with the desired switching level, and wherein the closure limit is placed higher according to the recorded height difference.

3. The calibration method as claimed in claim 2, wherein the closure limit is placed higher by making a hole in the casing of the immersion tube.

4. The calibration method as claimed in claim 3, wherein the hole is punched.

5. A method for calibrating a sensor for sensing the level of a liquid including:

a frame;

a pressure transducer disposed on the frame;

an electrical switch disposed on the frame and operatively connected to the pressure transducer;

a mechanical transmission operatively connecting the pressure transducer and the electrical switch to one another; and an immersion tube operatively connected to the frame and defining a closure limit location thereon, the sensor further being configured such that, when the level of the liquid rises beyond the closure limit location of the immersion tube along a longitudinal extent thereof, a volume of air is trapped in the sensor, the pressure transducer being configured for recording a pressure of the volume of air, the pressure transducer further being configured for actuating the electrical switch via the mechanical transmission when the level of the liquid rises beyond the closure limit location up to an actual switching level on the immersion tube;

the method comprising the step of compensating for a variation between the actual switching level on the immersion tube and a desired switching level on the immersion tube caused by random production differences of the sensor by placing a new closure limit location on the insertion tube above the closure limit location in a direction parallel to the longitudinal extent of the immersion tube.

6. The method according to claim 5, further comprising the steps of:

fixing the sensor at a predetermined height above the liquid level;

exposing the sensor to a rising level of the liquid;

recording the actual switching level reached at a corresponding switching time; and determining a height difference between the closure limit location and the actual switching level along the longitudinal extent of the immersion tube;

wherein the step of placing a new closure limit location on the insertion tube above the closure limit location comprises the step of placing the new closure limit location below the desired switching level by a distance equal to the height difference.

7. The method according to claim 5, wherein the step of placing includes the step of creating a hole in a casing of the immersion tube.

8. The method according to claim 7, wherein the step of creating includes the step of punching the hole in the casing of the immersion tube.

* * * * *